United States Patent [19]

Ajax

[11] Patent Number: 4,846,079
[45] Date of Patent: Jul. 11, 1989

[54] ADJUSTABLE FRAME FOR FURNITURE

[75] Inventor: Erick S. Ajax, Minneapolis, Minn.

[73] Assignee: E. J. Ajax & Sons, Co., Inc., Minneapolis, Minn.

[21] Appl. No.: 238,912

[22] Filed: Aug. 31, 1988

[51] Int. Cl.$^4$ ................................................ A47B 3/06
[52] U.S. Cl. .................................... 108/156; 248/188; 108/111
[58] Field of Search ............... 108/156, 157, 158, 111; 211/182, 189, 186; 248/165, 188; 403/254, 260, 235, 234, 236, 191

[56] References Cited

U.S. PATENT DOCUMENTS

| | | | |
|---|---|---|---|
| 554,578 | 2/1896 | Boughton | 248/188 |
| 577,229 | 2/1897 | Bosch | 248/188 |
| 2,669,497 | 2/1954 | Bailey . | |
| 3,341,160 | 9/1967 | Jones, III | 108/156 X |
| 3,399,912 | 9/1968 | Maspero . | |
| 3,420,484 | 1/1969 | Mattick | 108/156 X |
| 3,443,530 | 5/1969 | Carlson | 108/156 |
| 3,479,975 | 11/1969 | Ferdinand et al. . | |
| 3,572,787 | 3/1971 | Timmerman | 248/188 X |
| 3,590,753 | 7/1971 | Bunk | 248/188 |
| 3,884,358 | 5/1975 | Marschak | 211/186 |
| 4,124,186 | 11/1978 | Call, Sr. . | |
| 4,396,173 | 8/1983 | Call, Sr. . | |
| 4,585,365 | 4/1986 | Manno | 248/188 X |

FOREIGN PATENT DOCUMENTS

| | | |
|---|---|---|
| 7617152 | 2/1977 | France . |
| 8300425 | 9/1984 | France . |
| 398920 | 3/1966 | Switzerland . |
| 480043 | 12/1969 | Switzerland . |

*Primary Examiner*—Kenneth J. Dorner
*Assistant Examiner*—Jose V. Chen
*Attorney, Agent, or Firm*—Lawrence M. Nawrocki

[57] ABSTRACT

An apparatus for mating a structural element to a pair of frame members. The mating apparatus includes a stud carried by the element, a pin carried by each of the frame members, a brace positioned, during mating, so that inwardly turned portions formed at each lateral end of the brace engage a corresponding pin carried by the frame members. Structure is provided to urge the brace progressively closer to the structural element. As this urging occurs, the pins carried by the frame members are driven toward the structural element by the corresponding associated inwardly turned portions of the braces until the pins can be urged no farther. As this occurs, tightening of the frame members to the structural element occurs.

7 Claims, 2 Drawing Sheets

ADJUSTABLE FRAME FOR FURNITURE

TECHNICAL FIELD

The present invention deals broadly with the field of furniture. More narrowly, however, it is related to the construction of a frame of, for example, an adjustable table with a corner construction wherein a leg is attachable to the frame easily and without use of expensive components. The preferred embodiment of the invention is directed to a leg attachment device which facilitates mating of a table leg to the framework of the table.

BACKGROUND OF THE INVENTION

Certainly tables are one of the most versatile pieces of furniture available for use in buildings. Such is true regardless of whether the building is intended for residential or business purposes.

The table remains one of the most functional furniture articles on the market today. Sales of dining tables total astronomical sums. Special application tables such as card and game tables proliferate, and such items are commonly seen available for purchase in shopping centers and malls.

Even beyond the functional aspects of tables, however, they possess decorative qualities which make them desirable for non-functional purposes. Tables are used for supporting knick-knacks, plants, statuary, etc. In fact, the decorative applications for tables are limited only by the imagination.

Tables vary in terms of their construction. That is, while some are intended to be of substantially one-piece construction in that, once any component parts are assembled, they are intended to remain in an assembled configuration, other tables are intended to be easily assembled and disassembled. Typically, the type of construction will be dicated by intended use and application.

In the case of disassemblable tables, manufacturers are presented with problems because of the numerous component parts necessary in view of various standard sizes of tables which are typically made available on the market. The problem is further aggrevated by the fact that there is a demand for "custom" sizes.

Storage space limitations arise and, in some situations, can be critical. Tables of the type which are easily assemblable and disassemblable typically include relatively standard legs which can be interchanged from one table to another. Frames which mate to the legs and support the table top, however, have no standardization or universality. It is apparent that, as the size of the table top increases or decreases, the size of the support frame members must increase or decrease commensurately. It quickly becomes clear to someone entering a market for such products that, unless the company is to be content to sell one or only a few standard sizes of tables, a large component storage facility must be available. By limiting the types of products sold by the company, however, the company becomes less competitive in the marketplace.

Another problem, the potential of which can be devastating to a new business enterprise, is the requirement for purchase of welding equipments and other major capital investments. Particularly in this age of robotic technology, such capital outlays can be preclusive to the entering into a new endeavor.

In response to this particular problem, attempts have been made to develop readily assemblable and disassemblable tables where welding is unnecessary. Attempts have been made to provide tables wherein the legs can be attached and detached from frame support members without welding. One illustration of such an attempt is Swiss patent No. 398,920 which issued on Mar. 15, 1966. That patent illustrates a system wherein support frame members are mated to the legs quickly and easily and without any requirement for welding on the part of the assembly.

Systems as illustrated in that document, however, yet retain certain drawbacks. For example, mating of the various major components and fittings can be a slow process. Because of the relatively intricate connections necessary to be made and the inflexible, fixed positions of various of the fittings, assembly can be difficult to the point of causing undesirable slow-downs. Such delays can be significant, and they can translate into substantial loss of revenues.

It is to these problems of the prior art that the present invention is directed. It includes apparatus for facilitating the mating of components such as those of a quickly assemblable and disassemblable table. It provides for the avoidance of substantial welding requirements without sacrificing speed of assembly.

SUMMARY OF THE INVENTION

The present invention includes apparatus for mating a structural element, such as a leg of a table, to a pair of frame members which, either alone or in combination with other frame members, support, for example, a table top. In the construction and application for which the present invention is designed, the pair of frame members intersect at the leg element to define a plane general orthogonal to an axis of elongation of the leg element. The mating apparatus includes a stud carried by the leg. The stud is affixed to the leg at a location therealong so that it is coextensive, with respect to the axis of elongation of the leg, with the frame members when they are mated to the leg. The stud extends from the leg at an angle so that it bifurcates an angle defined by the intersecting frame members. Typically, the angles formed by such bifurcation are equal. The apparatus further includes a pin carried by each of the frame members. Each of the pins is disposed for orientation generally parallel to the axis of elongation of the leg element, and each pin is rendered movable along the frame member by which it is carried in directions toward and away from the leg element to which the frame member is to be mated. A position, relative to the leg, is defined in each frame member, and the pin carried by that particular frame member is precluded from moving toward the leg beyond that defined position. The apparatus also includes a brace, the brace having an aperture formed generally centrally therein. The brace is positioned, during mating, so that the stud extends through the aperture and so that inwardly turned portions formed at each lateral end of the brace engage a corresponding pin carried by a different one of the frame members. Means are provided to urge the brace, with the stud extending through the aperture formed therein, progressively closer to the leg element. As this urging occurs, the pins carried by the frame members are driven toward the leg element by the corresponding associated inwardly turned portions of the braces until the pins can be urged no farther. As this occurs, tightening of the frame members to the leg element occurs.

If desired, the adjustability of the pins can be provided along other axes. For example, a pin can be disposed for movement along an axis generally transverse to an axis aligned in a direction toward and away from the leg element to which the frame member is to be mated. While such movement of the pins might not be as advantageous as would movement in a direction toward and away from the leg element, such a configuration would still provide some measure of flexibility so that mating of the frame members to the leg could be facilitated.

If the preferred embodiment of the invention, the means by which the pins are carried by the frame members can comprise coextensive key-hole-like slots formed in overlying portions of a frame member. Typically, the frame member is structured to include a pair of generally parallel flanges and an interconnecting web. In such a case, the key-hole-like slots are formed with one of the slots in each of the parallel flange portions, the slots being registered one with the other.

With the means for mounting the pins being so constructed, a pin can be made with a central spindle portion having a given diameter, cap portions, having diameters similar to that of the spindle portion, at either end of the spindle portion, and reduced-diameter annular cavities between the spindle portion and each cap portion. The diameter of the cap portions would be greater than the slot extensions on either side of an expanded middle portion of the slot but smaller than the expanded slot middle portion. Consequently, a pin could be inserted through the expanded middle portion of the slot and slid toward the end of the frame member at which the member is to be mated to the leg element. The pin would not, therefore, come out of the slot since the cap portions of the pin would preclude axial dislocation.

In the preferred embodiment, the inwardly turned portions of the brace are provided with a dimension, extending from the intersection of the inwardly turned portion with an interconnecting web portion of the brace, just slightly greater than the diameter of the spindle portion of the associated pin. Unnecessary interference of the various components is, thereby, minimized.

Additionally, the inwardly turned portions of the brace are, it is envisioned, configured relative to the interconnecting web portion so that they form an angle of substantially 90° relative to the interconnecting web portion. By so structuring the brace, the mating function is, again, facilitated.

The invention further envisions providing a standard length frame member which is slotted, through one of the flange portions, to facilitate cutting to a desired length. Such slotting can be made at intervals at any desired distance, depending upon typical dimensions of table tops with which such a frame network would be used. Key-hole-like slots in the flange portions of the frame members would be provided at defined distances from each slot defining a cutting location. Consequently, regardless of where the frame member would be cut to length, the key-hole-like slots for receiving a pin would be at a desired distance relative to the end of the member engaging the leg element to which it is to be mated.

The present invention is thus an improved adjustable frame for furniture which overcomes problems existent in the prior art. More specific features and advantages obtained in view of those features will become apparent with reference to the DETAILED DESCRIPTION OF THE INVENTION, appended claims, and accompanying drawings.

BRIEF DESCRIPION OF THE DRAWINGS

DETAILED DESCRIPTION OF THE INVENTION

Figure 1:
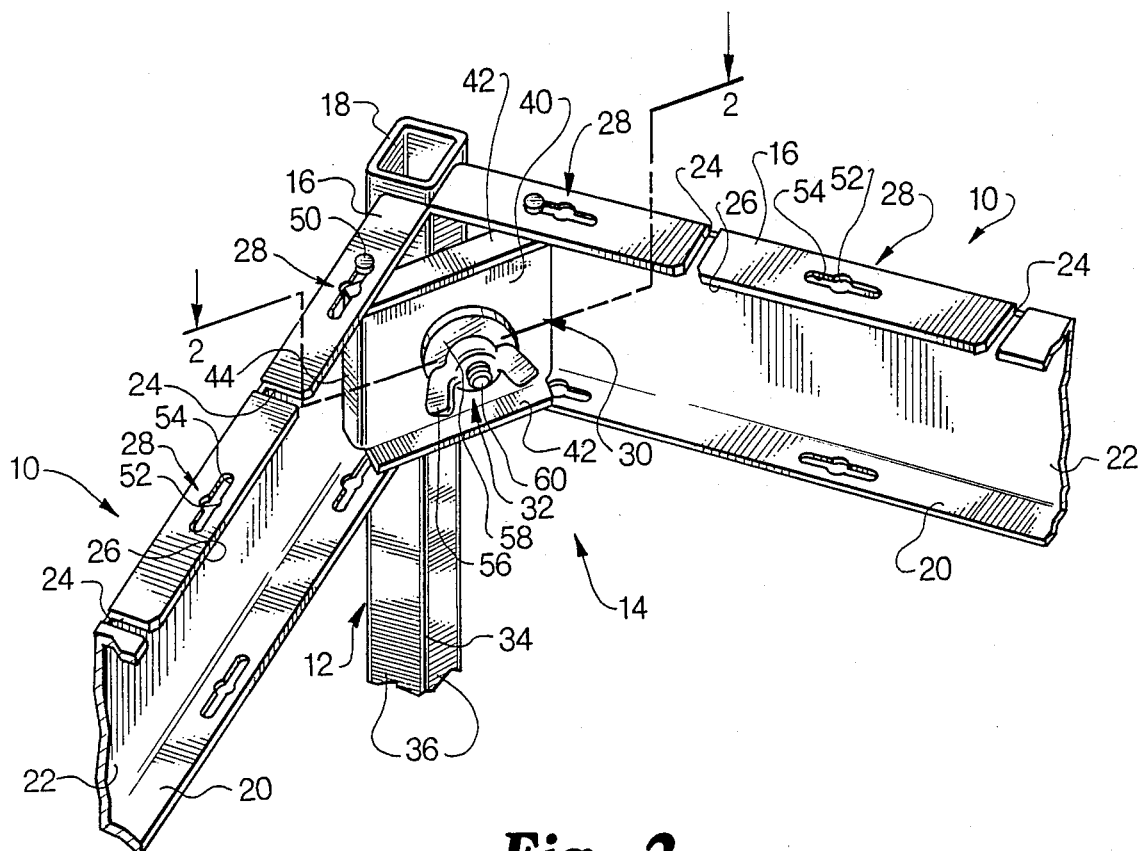
FIG. 1 is a fragmentary perspective view of a leg element and a pair of frame members in an assembled configuration.
Figure 3:
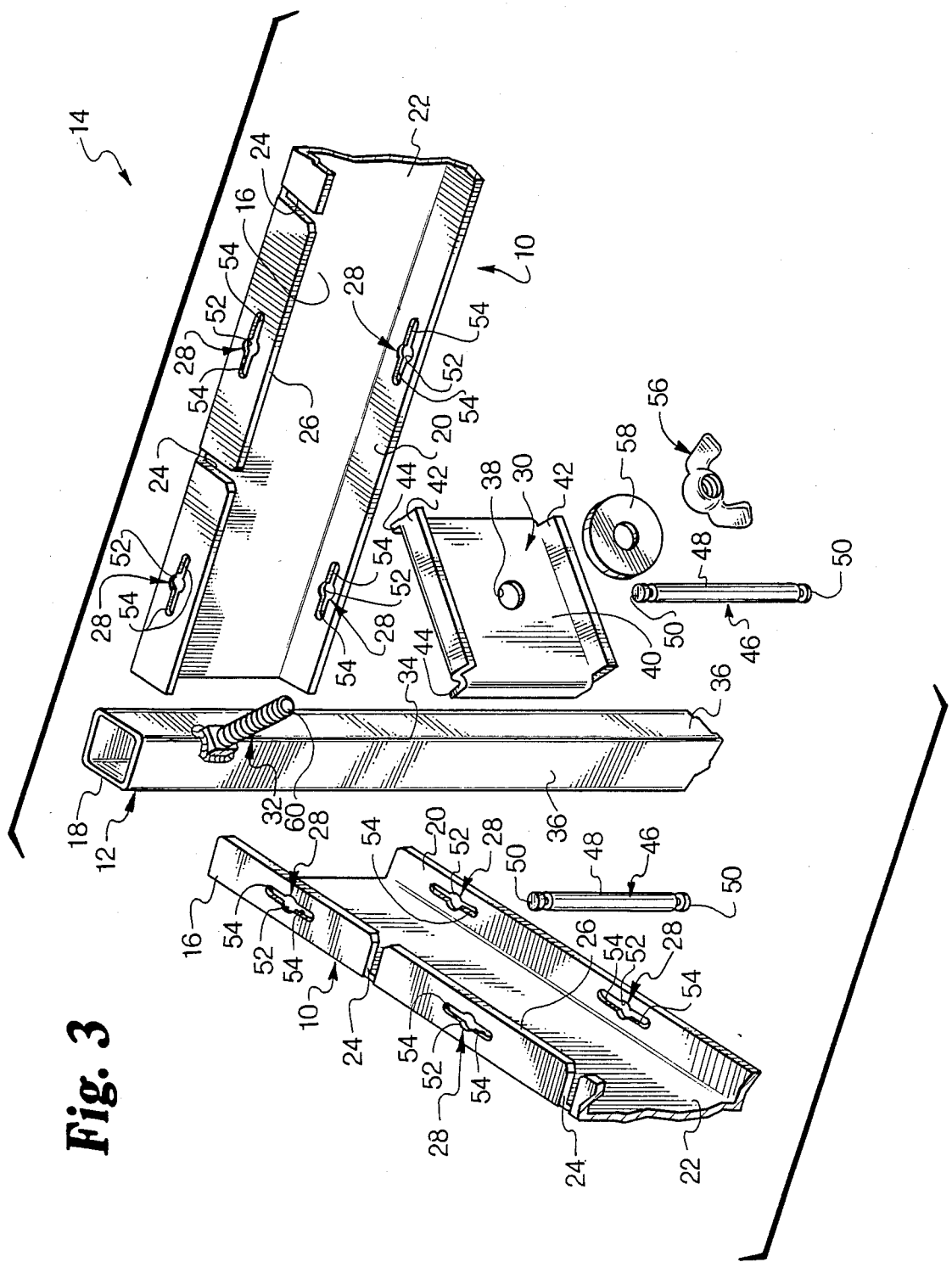
FIG. 3 an exploded perspective view of the structural elements illustrated in FIG. 1.

Referring now to the drawings, wherein like reference numerals denote like elements throughout the several views, FIGS. 1 and 3 illustrate the components comprising the apparatus of the present invention. In FIG. 1, those components are in an assembled configuration, while, in FIG. 3, those components are in a disassembled configuration.

The invention includes apparatus for mating a pair of frame members 10 to a leg element 12 at a corner of the intended overall frame structure 14. Typically, the frame members 10 would be mated so that an upper flange 16 of each of the members 10 is flush or close-to-flush with the upper end 18 of the leg 12. It will be understood, however, that this is not an exclusive construction, and FIG. 1 illustrates a mating wherein the upper flanges 16 are a slight distance down from the top of the leg 12.

In certain circumstances, it might be desirable to cap the top of each leg 12 of a table in a decorative fashion and have a table top (not shown) cut so that the top of each leg 12 were exposed to view. In any case, however, in most circumstances, the upper flange portion 16 of each frame member 10 would be substantially flush with the top of the leg 12 so that the table top could be overlain on the assembly 14, and screws, or other mating means (not shown) could be passed through apertures (not shown) in the upper flange 16 and directly into the underside of the table top to secure the frame assembly 14 thereto.

As previously discussed, each frame member 10 includes an upper flange 16. As can be seen, however, each member 10 is generally U-shaped in that it also includes a lower flange 20 and an interconnecting web portion 22. It is intended that, when the frame members 10 are mated to one or more leg elements 12 to form a table construction, the flange portions 16, 20 of the frame members 10 extend inwardly. By disposing the frame members 10 in this fashion, the finished product is provided with a more aesthetic appearance, and this is particularly true in view of the fact that the frame members 10 are intended to be pre-painted.

As seen in the figures, the upper flanges 16 of the frame members 10 are provided with slots 24 extending through the flange 16 in which they are formed, fully from the distal edge 26 of the flange 16 to the interconnecting web portion 22. These slots 24 run, therefore, generally transverse to the axis of elongation of the frame member 10. It is intended that they be spaced at equal, defined intervals along the length of frame member raw stock.

In order to minimize the number of sizes of frame member stock a table assembler must maintain, a universal, fixed-length bar sufficiently long to accommodate any desired table length could be kept in store. In view of the slots 24 being spaced at certain defined intervals, the bar stock could be cut to a desired length by the employment of a tool (not shown) which would cut across the interconnecting web portion 22 and the flange 20 not having the slots 24 defined therein. As will be able to be seen in view of this disclosure, the slots 24 not only would define cutting locations, but they would also establish locations at which cutting would be facilitated because of the absence of a second flange portion to be cut through.

The figures illustrate a key-hole-like slot 28, extending in a direction aligned with the axis of elongation of the frame member 10, formed in each section of the upper flange 16 between adjacent cutting location defining slots 24. It will be understood that distances between cutting location defining slots 24 and, therefore, the distance between a key-hole-like slot 28 and the end of the frame member 10, are dictated, in part, by the dimensions of a brace 30 that will be discussed hereinafter.

The construction of the leg element 12, as shown in the figures, is generally square, with rounded corners, in cross-section. It will be understood, however, that this is not an exclusive manner of construction, and other cross-sectional configurations are contemplated. Additionally, while metal is envisioned as the optimum material from which the leg element or elements would be made, other materials could also be employed. For example, plastics and wood might also suffice.

Figure 2:
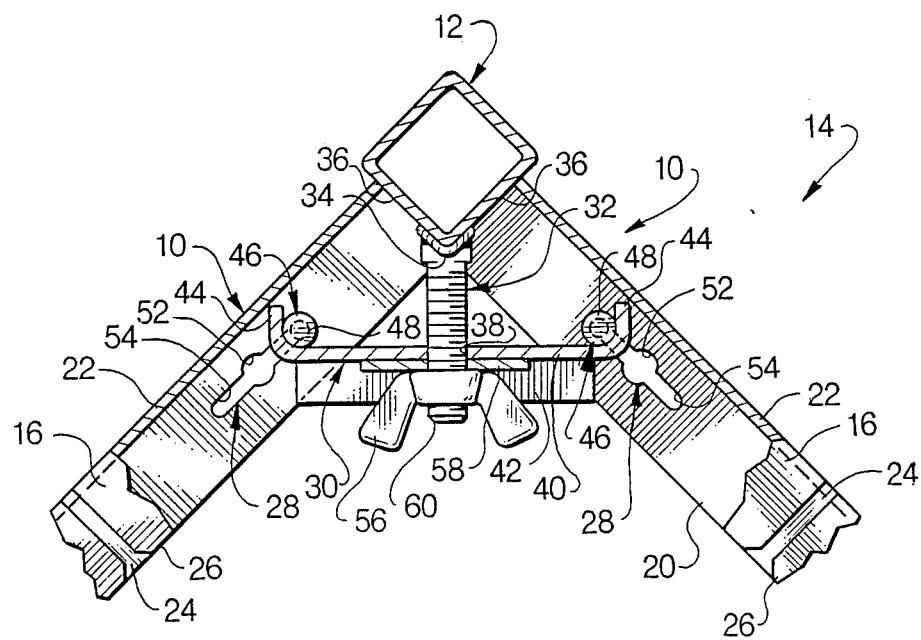
FIG. 2 is a top plan sectional view taken generally along the line 2—2 of FIG. 1.

FIGS. 2 and 3 illustrate a threaded stud 32 extending from one corner 34 of the leg element 12. Because of the generally square cross-section of the leg 12, the stud 32 is made to extend at approximately 135° from each of two angularly-adjacent faces 36 of the leg 12.

A brace 30 having a generally centrally positioned aperture 38 formed therein is manuevered between the frame members 10 with the stud 32 received through the aperture 38. A main portion, or interconnecting web portion 40, of the brace 30 is generally planar in configuration. As in the case of the frame members 10, however, it can be provided with upper and lower flange portions 42 which afford strengthening capacity. Both lateral ends of the brace 30 are provided with an inwardly turned portion 44. Consequently, as best seen in FIG. 2, a plan cross-sectioned view of the brace 30 is generally U-shaped.

FIG. 3 illustrates a pin 46 which is receiveable through a pair of registered key-hole-like slots 28 most closely proximate the end of the frame member 10 to be engaged against the leg element 12, when mating is accomplished. The pin 46 includes a spindle portion 48 and a cap portion 50 at each end. The length of the pin 46 is sufficient so that the cap portions 50 will straddle the corresponding frame member 10 therebetween.

An enlarged central portion 52 of each key-hole-like slot 28 has a diameter sufficient to allow passage of the cap portions 50 so that the cap portions 50 of a single pin 46 can be made to extend exteriorly of the flange portions 16, 20 of a frame member 10. With the pin 46 so inserted, it can be slid along the slots 28 toward the end of the frame member 10 which is to engage the leg element 12. Because the diameters of the cap portions 50 are larger than the slot extensions 54, the pin 46 will be retained within the registered slots 28 as long as it is not again aligned with the expanded central portions 52 thereof.

As seen in FIGS. 1 and 2, a pin 46 is inserted into the endmost key-hole-like slots 28 of each frame member 10 to intersect at the leg element 12. In view of the employment of two of such pins 46 and the coordination of dimensions of the various components, the inwardly turned portions 44 of the brace 30 will be able to capture the two pins 46 between these inwardly turned portions 44.

Means are provided to urge the brace 30 progressively toward the leg element 12. In the preferred embodiment, said means comprise a wing nut 56 and lock washer 58 which are fitted over the distal end 60 of the stud 32. The stud 32 is threaded, and the wing nut 56 is internally threaded in a compatible fashion. Consequently, as the wing nut 56 is rotated onto the stud 32, it will force the washer 58 into engagement with the brace 30 and effect the urging of the brace 30 toward the leg element 12.

As the brace 30 approaches the leg 12, it will, in turn, drive the pins 46 toward ends of the slots 28 in which they are received, most closely proximate the ends of the frame members 10 to be engaged against the leg 12. As this occurs and the wing nut 56 continues to be rotated, the frame members 10 will be tightening into a rigid configuration with respect to the leg 12.

It will be understood that, in assembling, for example, a table, four of such matings will be accomplished, each mating creating a corner of the table support at one leg 12. Once the support assembly 14 is completed by effecting four such matings, the overall support assembly 14 could then be secured to the underside of a table top as previously alluded to. That is, screws, for example, could be passed through holes in the upper flanges 16 of the frame members 10 and into the underside of the table top.

As previously discussed, typically, the leg 12 would be made of metal. It will be understood that the typical material of which the brace 30, frame members 10, and other components would be manufactured is also metal. The intent is not, however, to exclude other materials, and plastics, for example, are also contemplated.

Numerous characteristics and advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. Apparatus for mating an element, having an axis of elongation, to a pair of frame members, intersecting at the element to define a plane generally orthogonal to the axis of elongation of the element, comprising:
   (a) an element;
   (b) a pair of frame members;
   (c) a stud, carried by the element, protruding therefrom generally parallel to the plane defined by the frame members and being coextensive, in a direction of the axis of elongation of the element, with the frame members, said stud bifurcating an angle formed by the intersection of the frame members into two substantially equal angles;
   (d) a pin carried by each of the frame members, each of said pins being disposed for orientation generally paralled to the axes of elongation of the element, and for movement along the frame member by which it is carried, away from the element and toward the element up to a defined position relative thereto;

(e) a brace having an aperature, through which said stud is received, formed generally centrally therein, and said brace further having, at each lateral end of said brace, a portion bent toward the element when said brace is disposed with said stud received through said aperture formed in said brace; and (f) means for urging said brace, when said stud is received through said aperture, progressively closer to the element;

(g) wherein, as said brace is urged progressively closer to the element, each of said portions of said brace bent toward the element engages a pin carried by a different one of the intersecting frame members and drives said pin, along the frame member by which it is carried, to said defined position, in order to tightly engage the frame members against the element.

2. Apparatus in accordance with claim 1 further comprising means for disposing each pin for movement along the frame member by which it is carried, in a direction generally transverse to the direction it moves away from, and toward, the element.

3. Apparatus in accordance with claim 2 wherein each frame member comprises a pair of generally parallel flanges and an interconnecting web, and wherein said flanges of each frame member have coextensive key-hole-like slots, in which a corresponding pin is received and along which the pin moves, formed therein.

4. Apparatus for mating a leg of a disassemblable table, having an axis of elongation, to a pair of frame members, by which a table top is supported, intersecting at the leg to define a plane generally normal to the axis of elongation of the leg comprising:

(a) a leg:

(b) a pair of frame members (c) a stud, carried by the leg, protruding therefrom generally parallel to the plane defined by the frame members and being coextensive, in a direction of the axis of elongation of the leg, with the frame members, said stud bisecting an angle formed by the intersection of the frame members;

(d) a pin carried by each of the frame members, each of said pins being disposed for orientation generally parallel to the axis of elongation of the leg, and for movement with respect to the frame member by which it is carried, recripocally along an axis generally perpendicular to an axis of the frame member extending toward the leg;

(e) a brace having an aperture, through which said stud is received, formed generally centrally therein, said brace having, at each lateral end thereof, a portion bent toward the leg when said brace is disposed with said stud received through said aperture formed in said brace; and (f) means for urging said brace, when said stud is received through said aperture, progressively closer to the leg;

(g) wherein as said brace is urged progressively closer to the leg, each of said inwardly turned portions of said brace at each lateral end thereof engages a pin carried by one of the intersecting frame members and drives said pin, along the frame member by which it is carred, to a position at which said pin can be urged no farther, in order to tightly engage the frame members against the leg.

5. Apparatus in accordance with claim 4 further comprising means for securing an assembly of frame members and at least one leg to a table top.

6. Apparatus in accordance with claim 4 wherein said portions of said brace bent toward the leg extend a distance slightly greater than a diameter of one of said pins.

7. Apparatus in accordance with claim 6 wherein said brace comprises a web portion interconnecting said portions bent toward the leg, and wherein said portions bent toward the leg form angles of approximatley 90° relative to said web portion of said brace.

* * * * *